May 19, 1925.
P. F. VOKAL
METHOD OF MAKING MILLING CUTTERS
Filed Jan. 30, 1922
1,538,763
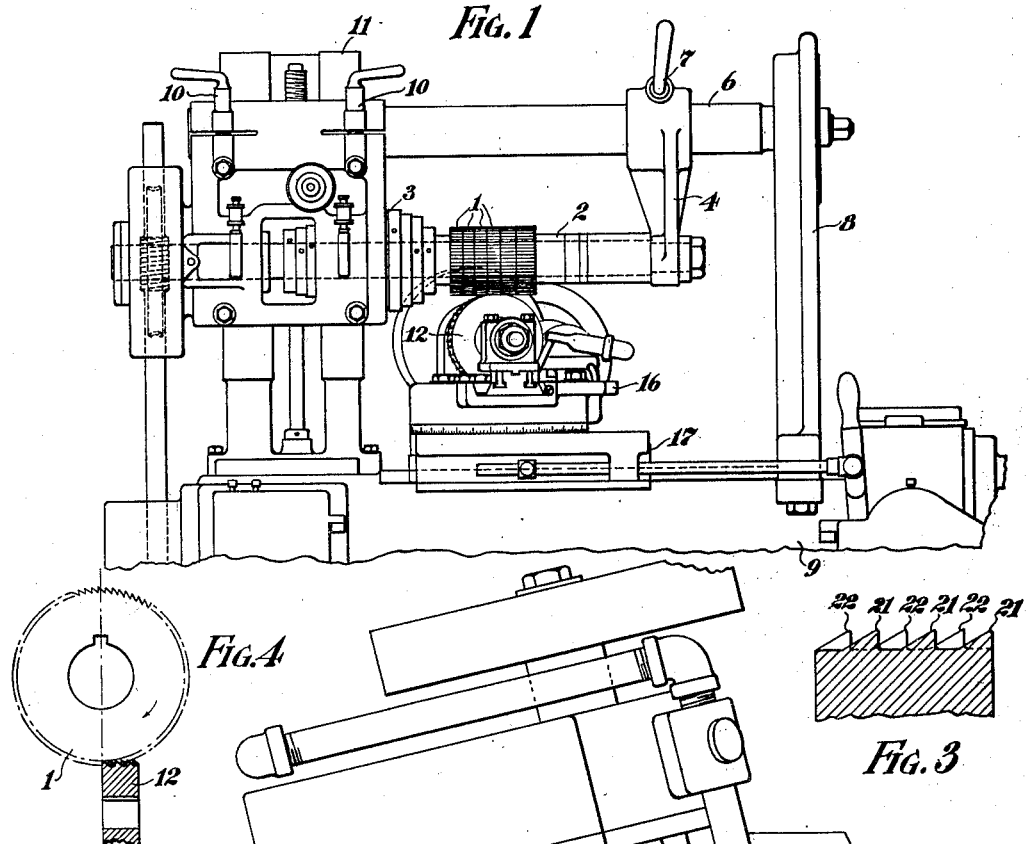
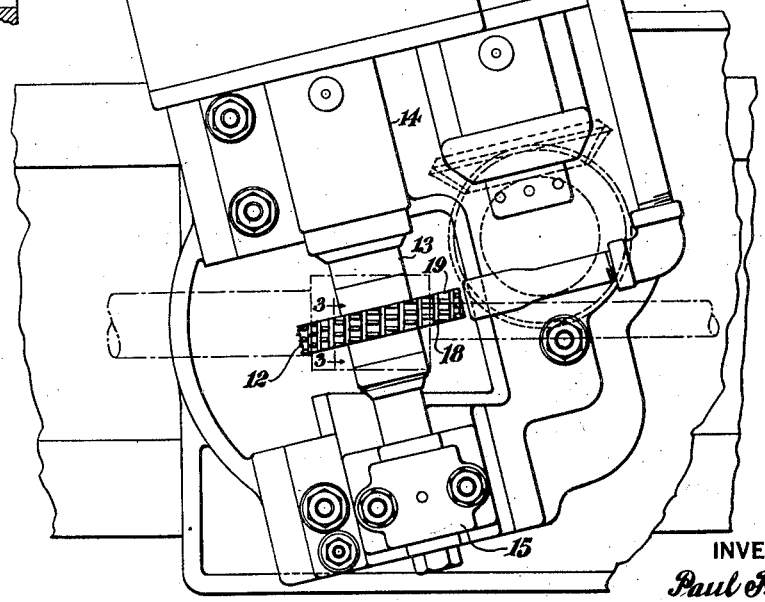
INVENTOR
Paul F. Vokal,
BY Wayne B Wells
ATTORNEY Patented May 19, 1925.

1,538,763

UNITED STATES PATENT OFFICE.

PAUL F. VOKAL, OF HARTFORD, CONNECTICUT, ASSIGNOR TO PRATT & WHITNEY COMPANY, OF NEW YORK, N. Y., A CORPORATION OF NEW JERSEY.

METHOD OF MAKING MILLING CUTTERS.

Application filed January 30, 1922. Serial No. 532,669.

*To all whom it may concern:*

Be it known that I, PAUL F. VOKAL, a citizen of the United States, residing at Hartford, in the county of Hartford and State of Connecticut, have invented certain new and useful Improvements in Methods of Making Milling Cutters, of which the following is a specification.

My invention relates to methods of making milling cutters and particularly to methods of making screw-slotting milling cutters.

One object of my invention is to provide a method of forming the so-called screw-slotting milling cutters in a simple and in an efficient manner by a hobbing process.

Another object of my invention is to provide a method of simultaneously forming a number of of milling cutters having sharp teeth, which consists in rotating a plurality of cutter blanks on the same axis, in providing a hob having rows of teeth arranged with a lead, the teeth in each row being staggered with respect to those in each adjacent row, in rotating the hob in timed relation to the rotation of the blanks, and in effecting feeding movement between the hob and the blanks.

A further object of my invention is to provide a method of simultaneously forming a number of milling cutters having sharp pointed teeth, which consists in rotating a plurality of cutter blanks on the same axis, in providing a hob having rows of teeth arranged with a lead, the teeth in each row being staggered with respect to those in each adjacent row, in positioning the hob axis with respect to the axis of the blanks in accordance with the lead of the teeth on the hob, in rotating the hob in timed relation to the rotation of the blanks, and in effecting feeding movement of the hob with respect to the blanks.

At the present time, it is customary to form the so-called screw-slotting milling cutters by means of formed milling cutters in a milling machine. The cutters are preferably so shaped as to cut two or three teeth on the blanks for each movement across them. In the above method, it is apparent the blanks must be indexed for each movement of the cutter across them and moreover only a limited number of teeth are cut in the blanks for each movement of the formed cutter. Furthermore, it is difficult to obtain sharp teeth on the blank by means of a formed milling cutter when used in accordance with the above method.

In forming screw-slotting milling cutters by the hobbing process in accordance with my invention, only one movement of the hob across the blanks is required to shape the blanks with sharp pointed teeth. The hob, which is used in my method, is provided with spiral flutes and has rows of teeth which are arranged with a lead. The teeth in each row are staggered with respect to those in each adjacent row in order to cut very sharp teeth on the blanks. The hob is positioned with respect to the blanks in accordance with the lead of the teeth thereon and is rotated in timed relation to the rotation of the blanks.

In the accompanying drawing:

Figure 1 is a side elevational view of a hobbing machine adapted to operate in accordance with my invention.

Fig. 2 is an enlarged plan view of the machine shown in Fig. 1 with a portion of the apparatus removed.

Fig. 3 is an enlarged sectional view of the hob shown in Fig. 2 and taken along the line 3—3.

Fig. 4 is an enlarged end view of a screw-slotting milling cutter formed in accordance with my invention.

Referring to the drawing, a plurality of blanks 1 are rigidly supported on an arbor 2. The arbor 2 is carried by a headstock 3 and an outbearing hanger 4. The outbearing hanger 4 is adjustably supported on an overarm 6. The hanger 4 may be adjusted along the overarm 6 by loosening a screw 7. One end of the overarm 6 is fitted to a slot in a bracket 8 which is suitably supported on the main frame 9 of the machine. The opposite end of the overarm 6 is supported in the headstock 3 and is held in position by screws 10. The headstock 3 is slidably mounted on a support 11 in order to adjust the work vertically with respect to the hob which is disposed below the work. Any suitable means is provided for rotating the arbor 2 and the blanks 1.

A hob 12 is fixedly mounted on an arbor 13 which is provided with bearings 14 and 15. The arbor 13 is suitably geared to the means for rotating the arbor 2 in order to be rotated in timed relation to the rotation of the blanks 1. Moreover, the arbor 13 and the hob 12 are suitably mounted on adjusting slides 16 in order to permit the adjusting of the hob axis with respect to the axis of the blanks 1. The adjusting slides 16 are mounted on a slide 17 which is adapted to have movement parallel to the axis of the blanks 1. The slide 17 is operated in any suitable manner to feed the hob 12 along the blanks 1. The feeding means for the slide 17 is connected to the same source of power which rotates the blanks 1 and the hob 12 in order to effect movement in timed relation to the operation of the blanks and the hob. Machines of the above character are well known and a further description thereof is deemed unnecessary.

The hob, which is utilized in my process, is provided with spiral flutes 18 between which are located rows of teeth 19. The teeth in the rows are provided with a lead as indicated in Fig. 2 of the drawing. The hob 12 is positioned with respect to the blanks in accordance with such lead. The teeth in each of the rows 19 are staggered with respect to those in each adjacent row as is indicated in Figs. 2 and 3 of the drawing. Thus, the teeth 21 in one row are disposed between the teeth 22 of the adjacent row as indicated in Fig. 3 of the drawing. Accordingly, each tooth on the blanks is formed by one side of a tooth 21 and another side of a tooth 22. The point of each tooth on the blanks is formed by the intersection of the sides of the teeth 21 and 22. By such means the teeth on the blank can be formed with very sharp points. The teeth on the hob are shaped to cut radial teeth on the blanks. It may also be noted that the teeth on the hob are approximately twice the size of the teeth to be formed on the blanks.

In order to cut radial teeth on the blanks 1, it is necessary to position the hob 12 relative to the blanks, as shown in Fig. 4 of the drawing. The hob is so set as to be all on one side of the center of the blanks being cut, as shown in Fig. 4. The radial face of each tooth on the blanks is formed by the face of the hob tooth cutting as a flying cutter, the form of the blank tooth face being a reproduction of the face of the last hob tooth which is set radially with the axis of the blanks. The blanks are assumed to rotate in a clockwise direction as indicated by the arrow in Fig. 4 of the drawing.

In practicing my method, a number of blanks 1 are fastened together in any suitable manner on the arbor 2 as indicated in Fig. 1 and the hob 12 is positioned below the blanks as indicated in Figs. 1 and 2 of the drawing. The axis of the hob, as heretofore set forth, is positioned relative to the axis of the blanks in accordance with the lead of the hob. The hob is rotated in timed relation to the rotation of the blank and preferably the hob is fed across the blanks. However, if so desired, the blanks may be fed across the hob.

It will be understood that such changes and modifications may be made in my invention as fall within the limits of the appended claims.

What I claim is:

1. The method of forming a screw-slotting cutter having sharp pointed teeth provided with radial cutting faces, which consists in rotating a blank, in providing a spiral fluted hob having rows of teeth, the teeth in each row being staggered with respect to those in each adjacent row, in rotating the hob in timed relation to the rotation of the blank, and in effecting feeding movement between the blank and the hob.

2. The method of simultaneously forming a number of cutters having sharp pointed teeth provided with radial cutting faces, which consists in rotating a plurality of blanks on the same axis, in providing a spiral fluted hob having rows of teeth, the teeth in the rows being arranged with a lead and the teeth in each row being staggered with respect to those in each adjacent row, in rotating the hob in timed relation to the rotation of the blanks, and in feeding the hob across the blanks.

3. The method of forming cutters having sharp pointed teeth provided with radial cutting faces, which consists in rotating a plurality of blanks on the same axis, in providing a spiral fluted hob having rows of teeth, the teeth in the rows being arranged with a lead and the teeth in each row being staggered with respect to those in each adjacent row, in positioning the hob axis with respect to the axis of the blanks in accordance with the lead of the hob, in rotating the hob in timed relation to the rotation of the blanks, and in feeding the hob across the blanks.

4. The method of forming cutters having sharp pointed teeth provided with radial cutting faces, which consists in rotating a plurality of blanks on the same axis, in providing a hob having rows of teeth arranged with a lead, the teeth in each row being staggered with respect to those in each adjacent row, in positioning the hob axis with respect to the axis of the blanks in accordance with the lead of the hob, in rotating the hob in timed relation to the rotation of the blanks, and in feeding the hob across the blanks.

5. The method of forming a cutter having sharp pointed teeth provided with radial cutting faces, which consists in rotating a blank, in providing a hob having rows of teeth arranged with a lead, the teeth in each row being staggered with respect to those in each adjacent row, in positioning the hob axis with respect to the blank axis in accordance with the lead of the teeth on the hob, the end tooth of the hob having one face located in a plane perpendicular to the axis of the blank, in rotating the hob in timed relation to the rotation of the blank, and in effecting relative feeding movement between the hob and the blank.

6. The method of forming a cutter having sharp pointed teeth provided with radial cutting faces, which consists in rotating a blank, in providing a spiral fluted hob having rows of teeth, the teeth in each row being staggered with respect to the teeth in the adjacent rows, in so positioning the hob with respect to the blank that the end tooth of the hob cuts its own contour on the blank, in rotating the hob in timed relation to the rotation of the blank, and in effecting feeding movements between the blank and the hob.

7. The method of forming a cutter having sharp pointed teeth provided with radial cutting faces, which consists in rotating a blank, in providing a spiral fluted hob having rows of teeth, the teeth in each row being staggered with respect to the teeth in the adjacent rows, in so positioning the hob with respect to the blank that one cutting face of the last blank tooth is in a radial plane with respect to the blank, in rotating the hob in timed relation to the rotation of the blank, and in effecting feeding movement between the blank and the hob.

8. The method of forming a cutter having sharp pointed teeth provided with radial cutting faces, which consists in rotating a blank, in providing a hob having rows of teeth, the teeth in each row being staggered with respect to the teeth in the adjacent rows, in so positioning the hob that one tooth on the hob cuts its own contour on the blank, in rotating the hob in timed relation to the rotation of the blank, and in effecting feeding movement between the blank and the hob.

9. The method of forming a cutter having sharp pointed teeth provided with radial cutting faces, which consists in rotating a blank, in providing a hob having rows of teeth and a tooth having one finishing cutting edge, the teeth in each row being staggered with respect to the teeth in the adjacent rows, in so positioning the hob that the finishing cutting edge is in a radial plane with respect to the cutter, in rotating the hob in timed relation to the rotation of the blank, and in effecting feeding movement between the blank and the hob.

In testimony whereof, I hereto affix my signature.

PAUL F. VOKAL.